United States Patent
Johansson et al.

(10) Patent No.: US 9,332,575 B2
(45) Date of Patent: May 3, 2016

(54) METHOD AND APPARATUS FOR ENABLING CONNECTIVITY IN A COMMUNICATION NETWORK

(75) Inventors: Mattias Johansson, Solna (SE); Vincent Huang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 954 days.

(21) Appl. No.: 12/663,975

(22) PCT Filed: Jun. 27, 2007

(86) PCT No.: PCT/SE2007/000629
§ 371 (c)(1),
(2), (4) Date: Dec. 10, 2009

(87) PCT Pub. No.: WO2009/002236
PCT Pub. Date: Dec. 31, 2008

(65) Prior Publication Data
US 2010/0177663 A1    Jul. 15, 2010

(51) Int. Cl.
*H04L 12/28* (2006.01)
*H04W 4/00* (2009.01)
*H04W 76/02* (2009.01)
*H04W 12/08* (2009.01)
*H04L 29/08* (2006.01)
*H04L 29/06* (2006.01)

(52) U.S. Cl.
CPC ........... *H04W 76/02* (2013.01); *H04L 65/1016* (2013.01); *H04L 65/1073* (2013.01); *H04L 67/125* (2013.01); *H04W 4/00* (2013.01); *H04W 4/005* (2013.01); *H04W 12/08* (2013.01); *H04L 63/0823* (2013.01)

(58) Field of Classification Search
CPC ..................................................... H04W 76/02
See application file for complete search history.

(56) References Cited

U.S. PATENT DOCUMENTS

| | | | |
|---|---|---|---|
| 7,913,096 B2* | 3/2011 | Leone et al. ................... | 713/193 |
| 7,933,591 B2* | 4/2011 | Blom et al. ................... | 455/419 |
| 8,599,867 B2* | 12/2013 | Hicks et al. ................... | 370/401 |
| 2002/0012433 A1* | 1/2002 | Haverinen ............. | H04L 63/08 |
| | | | 380/247 |

(Continued)

FOREIGN PATENT DOCUMENTS

| | | |
|---|---|---|
| FR | 2889784 A1 | 2/2007 |
| GB | 2391135 A | 1/2004 |

(Continued)

*Primary Examiner* — Eunsook Choi
(74) *Attorney, Agent, or Firm* — Rothwell, Figg, Ernst & Manbeck, P.C.

(57) ABSTRACT

A method and apparatus for providing connectivity with a public communication services network (204) for a mobile terminal (200). A temporary connectivity identity and associated security parameters are obtained from the network (2:1) and loaded into the mobile terminal from a connectivity providing unit (202) over a local communication link (2:2). When the mobile terminal (2:3) later sends an access request to the network including the temporary connectivity identity, the mobile terminal is registered with the network based on the temporary connectivity identity and associated security parameters. If the network can validate the temporary connectivity identity by means of the associated security parameters (2:5), a connection can be set up with the mobile terminal (2:6) for communication services in the network.

12 Claims, 3 Drawing Sheets

(56) References Cited

U.S. PATENT DOCUMENTS

| | | | |
|---|---|---|---|
| 2002/0111159 A1 | 8/2002 | Faccin et al. | |
| 2003/0061503 A1 | 3/2003 | Katz et al. | |
| 2004/0078571 A1* | 4/2004 | Haverinen | H04L 9/0869 713/168 |
| 2005/0266883 A1* | 12/2005 | Chatrath | H04B 1/3816 455/558 |
| 2006/0141987 A1 | 6/2006 | De Groot | |
| 2006/0291454 A1* | 12/2006 | Ali | 370/352 |
| 2007/0079142 A1* | 4/2007 | Leone et al. | 713/193 |
| 2007/0083470 A1* | 4/2007 | Bonner | H04W 48/02 705/51 |
| 2008/0260149 A1* | 10/2008 | Gehrmann | G06Q 20/3821 380/247 |
| 2008/0273704 A1* | 11/2008 | Norrman | H04L 63/062 380/278 |
| 2009/0132806 A1* | 5/2009 | Blommaert | H04L 9/0844 713/151 |

FOREIGN PATENT DOCUMENTS

| | | |
|---|---|---|
| WO | 9740616 A1 | 10/1997 |
| WO | 03101082 A1 | 12/2003 |
| WO | 2004088641 A2 | 10/2004 |

* cited by examiner

METHOD AND APPARATUS FOR ENABLING CONNECTIVITY IN A COMMUNICATION NETWORK

CROSS-REFERENCE TO RELATED APPLICATION

This application is a 35 U.S.C. §371 National Phase Application from PCT/SE2007/000629, filed Jun. 27, 2007, and designating the United States.

TECHNICAL FIELD

The present invention relates generally to a method and apparatus for enabling connectivity for a mobile terminal in a public communication services network without requiring a subscription and a SIM (Subscriber Identity Module) or the equivalent.

BACKGROUND

While traditional 2G mobile telephony is used mainly for wireless communication of circuit-switched voice calls, the 3G mobile telephony has been developed to support wireless communication of packet-switched multimedia sessions using IP (Internet Protocol). For example, the communication protocols used for GPRS (General Packet Radio Service) and UMTS (Universal Mobile Telecommunications System) support packet-switched multimedia services.

A user subscribing to a 2G or 3G mobile access network is typically obliged to have a physical SIM (Subscriber Identity Module) card or similar installed in his/her communication terminal, in order to obtain connectivity with the network. The SIM is thus tied to a mobile subscription and holds a subscription identity and various associated security parameters which the terminal must use when registering with the network in order to gain access and connectivity. The SIM card can be moved between different terminals.

The information lodged in a SIM thus includes various "secrets shared with the network that are used for authenticated the subscriber and authorizing him/her to access and use services in the network. In particular, the SIM typically contains information for calculating parameters known as RES (mobile station authentication response), CK (ciphering key), and IK (integrity key) which are used to, in the following order, compared with a parameter called XRES (expected mobile station response) calculated by the network during the authentication procedure, encrypt the traffic and integrity protect the traffic.

As an alternative to traditional billing-based subscriptions, the subscription may be based on a pre-paid or "pay-as you-go" scheme where the user must pay in advance to "load" the SIM card, before being allowed to make calls or use other services. During registration with a public communication services network, the network will then identify the subscription and control its access and call/session time in accordance with the prepaid sum. Hence, the pre-paid connectivity still requires a subscription with the network and a SIM card or similar, along with a certain "infrastructure" associated therewith in the network.

A service and service-delivery control architecture called "IP Multimedia Subsystem" (IMS) has been developed by the 3$^{rd}$ Generation Partnership Project (3GPP) as a platform for handling multimedia services and sessions, commonly referred to as the IMS network. Thus, an IMS network can be used to initiate and control multimedia sessions for any IMS-enabled terminal connected to any type of mobile access network. The terminal must then, in addition to registering with a mobile access network, also register with the IMS network in order to gain access to the multimedia services. IMS basically uses the same registration routines as those defined for 3G access networks.

According to commonly used terminology for 3G, a UMTS SIM or "USIM" application is used for accessing a UMTS network, and an IMS SIM or "ISIM" application is used for accessing an IMS network. Further, the Universal Integrated Circuit Card (UICC) is a movable physical card in the terminal for holding various service applications in multimedia terminals such as an ISIM application and a USIM application, thus corresponding to the SIM card.

FIG. 1 illustrates schematically an IMS-enabled mobile terminal 100 in which a UICC 102 is installed. The UICC 102 holds a USIM application 102a for gaining connectivity with a UMTS mobile access network 104 and an ISIM application 102b for gaining connectivity with an IMS multimedia services network 106, as shown by dashed two-way arrows. Various other service applications for specific multimedia services may also be installed on the UICC 102, not shown.

However, communication network services based on a subscription and/or a SIM application are associated with various problems. As explained above, access to communication services in a mobile access network and/or an IMS network today requires the establishment of a subscription and that a SIM card or similar is issued for installation in a terminal, which is somewhat expensive and time-consuming to manage for both users and network operators. The SIM card and its associated parameters and functions are handled by the HLR (Home Location Register) node in the mobile access network and/or the HSS (Home Subscriber Server) node in the IMS network, respectively.

Further, a WLAN (Wireless Local Access Network) hotspot can be accessed by subscribers from any terminal by just entering a personal password for authentication. With this system, it is possible for anyone to "steal" a password and utilise the network services illegitimately. It is also possible for a network to pose as being another different network since there is no authentication of the network at the user side.

Another example relates to so-called M2M (Machine-to-Machine) modules that are often used for communicating data and information to support the operation of various equipments or systems. A surveillance system, e.g. for a power distribution network or a pipe system, may comprise a great number of distributed sensors configured to communicate various data or information from different locations to a central control station or the like over a mobile access network, using M2M modules as communication terminals. The M2M modules may thus be used to remotely collect data on, e.g., flow rates, pressures, temperatures, and equipment status as an alternative to manual, on-site data collection.

In such systems with distributed M2M modules, subscriptions must be established and a SIM card must be installed in each and every module. This can naturally be perceived as a significant burden, particularly if the subscriptions are relatively short-lived. In 3GPP, it is currently a requirement that the network operator can be switched remotely for M2M modules and that it should be possible to deploy M2M modules without SIM cards.

In 3GPP, efforts are made to provide connectivity solutions without using a physical SIM or UICC card, to further enable the switch of operators remotely. Also, it is desirable to avoid the handling of physical SIM/UICC cards in very unclean and polluted environments as open surfaces in the equipment easily becomes contaminated with the result of malfunction. It is thus generally desirable to reduce the efforts and costs associated with SIM-based subscriptions. A solution referred to as "Soft SIM" has been proposed to avoid the use of physical SIM cards, where a SIM application is delivered electronically without being tied to a physical card. Still, a subscription as well as parameters, keys and other secret data associated with the SIM application must be maintained and administrated for the Soft SIM solution, along with the necessary network infrastructure mentioned above.

In general, establishing a subscription and issuing a SIM card or Soft SIM provides limited flexibility and renders significant start-up costs in terms of both hardware and management. This scheme is therefore particularly unsuitable for short-term subscriptions. A further significant drawback is that the SIM-application may contain parts that are secret to the operator and also for the user, such as cryptographic algorithms and keys. This may result in specific requirements on the hardware of the device. Further, the Soft SIM solution for remotely switching the SIM may require an additional "player" related to the terminal manufacturer to take part in the SIM management. This additional player may thus be needed in order to verify the integrity of a secure element required in the terminal to securely store and compute cryptographic parameters.

Another disadvantage of ordinary SIM-subscriptions relates to making local calls when visiting a foreign country. A costly detour must then be made for the call to the home network in the home country due to the subscription, before connecting to a called local terminal in the visited country.

SUMMARY

The object of the present invention is to address at least some of the problems outlined above. It is thus generally desirable to avoid or at least reduce the drawbacks associated with subscription-based and/or SIM-based communications described in the background section above. These objects and others are achieved primarily by providing a method and apparatus according to the attached independent claims.

According to one aspect, a method of providing connectivity with a public communication services network for a mobile terminal, comprises obtaining a temporary connectivity identity and associated security parameters from the network, loading the temporary connectivity identity and associated security parameters into the mobile terminal from a connectivity providing unit over a local communication link, receiving an access request at the network from the mobile terminal including the temporary connectivity identity, and registering the mobile terminal in the network based on the temporary connectivity identity and associated security parameters, in order to set up a connection with the mobile terminal for communication services.

According to different embodiments, the local communication link may be any one of: a wireless Infrared link, a wireless Bluetooth link, a wireless NFC link, or a wired link.

The temporary connectivity identity may be validated at the network during registration by receiving at least a part of the associated security parameters from the terminal and comparing them with corresponding security parameters stored in the network.

The temporary connectivity identity is validated when the received parameters and the stored parameters are equal or correspond otherwise in a predetermined manner.

A predetermined amount of connectivity may include at least one of: call/session time, connectivity lifetime, and amount of data/bandwidth.

A remaining connectivity amount may be transferred from the terminal to another mobile terminal.

The mobile terminal may be an M2M module receiving the temporary connectivity identity and associated security parameters over the local communication link from an enterprise server.

One or more protection keys may also be loaded into the mobile terminal over the local communication link, to be used by the terminal to protect the communication when a connection has been established with the network.

The connectivity may be renewed by loading an updated temporary connectivity identity and associated security parameters into the terminal over the network.

According to another aspect, a connectivity providing unit for providing connectivity with a public communication services network for a mobile terminal, comprises an administrator unit adapted to obtain a temporary connectivity identity and associated security parameters from the network, and a data transfer unit adapted to load the temporary connectivity identity and associated security parameters into the mobile terminal over a local communication link, thereby enabling the mobile terminal to register with the network based on said temporary connectivity identity and associated security parameters, in order to set up a connection with the network for communication services.

The connectivity providing unit may be an enterprise server adapted to load temporary connectivity identities and associated security parameters into a plurality of M2M modules over local communication links.

According to yet another aspect, a mobile terminal adapted to obtain connectivity with a public communication services network comprises a data transfer unit adapted to receive a temporary connectivity identity and associated security parameters from a connectivity providing unit over a local communication link, and a mobile access unit adapted to register with the network based on said temporary connectivity identity and associated security parameters, in order to set up a connection with the network for communication services.

The mobile terminal may be adapted to use the temporary connectivity identity and associated security parameters to obtain connectivity with at least one of: a mobile access network, a WLAN and an IMS network.

The data transfer unit may be further adapted to transfer a remaining connectivity amount to another mobile terminal. The mobile terminal may be an M2M module adapted to receive the temporary connectivity identity and associated security parameters over the local communication link from an enterprise server acting as said connectivity providing unit.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DETAILED DESCRIPTION

Figure 1:
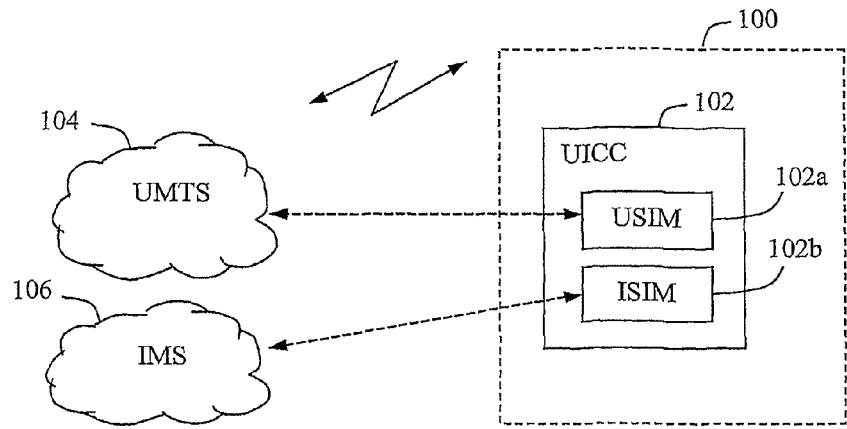
FIG. 1 is a schematic block diagram illustrating a mobile terminal having a physical card holding subscriber data, according to the prior art.

In this description, the terms "terminal" and "user equipment" are used interchangeably and are not to be understood differently with regard to their technical operations in this context. The various steps described below in connection with the figures should be primarily understood in a logical sense, while each step may involve the communication of one or more specific messages depending on the implementation and protocols used. The shown units are also to be understood logically without limitation to possible implementation in practice.

Briefly described, the present invention provides a solution for achieving connectivity with a public communication services network for a mobile terminal or user equipment, without requiring a pre-established subscription and a SIM application or the like in the used terminal. Connectivity with the communication services network can be obtained by loading a temporary connectivity identity and associated security parameters into the terminal from a connectivity providing unit by means of a local communication link. The mobile terminal can then use the received connectivity identity and security parameters, for as long as they are valid, to gain access to services in the network in a registration procedure.

The term "security parameters" represents any parameters or data required for gaining access to a public communication services network, depending on the implementation. The security parameters can also easily be adapted to existing security routines in the network with no impact on the network protocols used. For example, the security parameters may be a single code or similar, and the present invention is thus generally not limited to any specific number or type of security parameters, although some viable but non-limiting examples will be mentioned below.

The "local communication link" in this context should be understood as an isolated short-range link that cannot be overheard by a third party. It may be a wireless link, e.g. based on Infrared, Bluetooth or NFC (Near Field Communication) technologies which are deemed reasonably safe from eavesdropping, or simply a wired link using a suitable cable. The connectivity providing unit may be situated in a shop site or the like and controlled by a vendor or retailer selling connectivity. Before loaded into the mobile terminal, the temporary connectivity identity and associated security parameters are supplied by the communication services network to the connectivity providing unit in a suitable manner.

The connectivity providing unit may also supply protection keys to the terminal over the local communication link, to be used by the terminal to protect the communication when a connection has been established. Using the supplied protection keys successfully in communication after gaining access will automatically authenticate the network and validate the connectivity providing unit as well. In the following, the protection keys are distinct from the security parameters, although it may be useful in practice to provide the protection keys along with the security parameters. However, the present invention is not limited in this respect. Further, the network operator may have added a signature to the security parameters, enabling the terminal to verify the operator's signature at a trusted third party and thereby validate the connectivity providing unit.

The temporary connectivity identity is valid for a predetermined amount of connectivity in regard of the call/session time, the connectivity lifetime or the amount of transferred data/bandwidth, or any combination thereof, such that the user can utilise the obtained connectivity until the predetermined amount of connectivity has been consumed, as similar to the pre-payment scheme mentioned above from a user-perspective.

In this way, a user of the mobile terminal can easily purchase connectivity from a vendor or retailer controlling the connectivity provider unit, without, having a pre-established subscription and associated SIM parameters. Thus, no connection, trusted relation or agreement whatsoever with the network operator is necessary, in contrast to the previous subscription-based solutions. Since the connectivity amount has already been paid for, it is not necessary to use the rigid security routines for protection and safety associated with SIM-based subscriptions. It is only necessary to validate the used temporary connectivity identity towards the network by means of the associated security parameters. Further, when supplied protection keys are used successfully during communication after the terminal has gained access, the terminal user can automatically be ensured that the network is authenticated, and verifying the connectivity providing unit is as well. Thus, the only requirement from the network is basically that the used temporary connectivity identity is valid.

Figure 2:
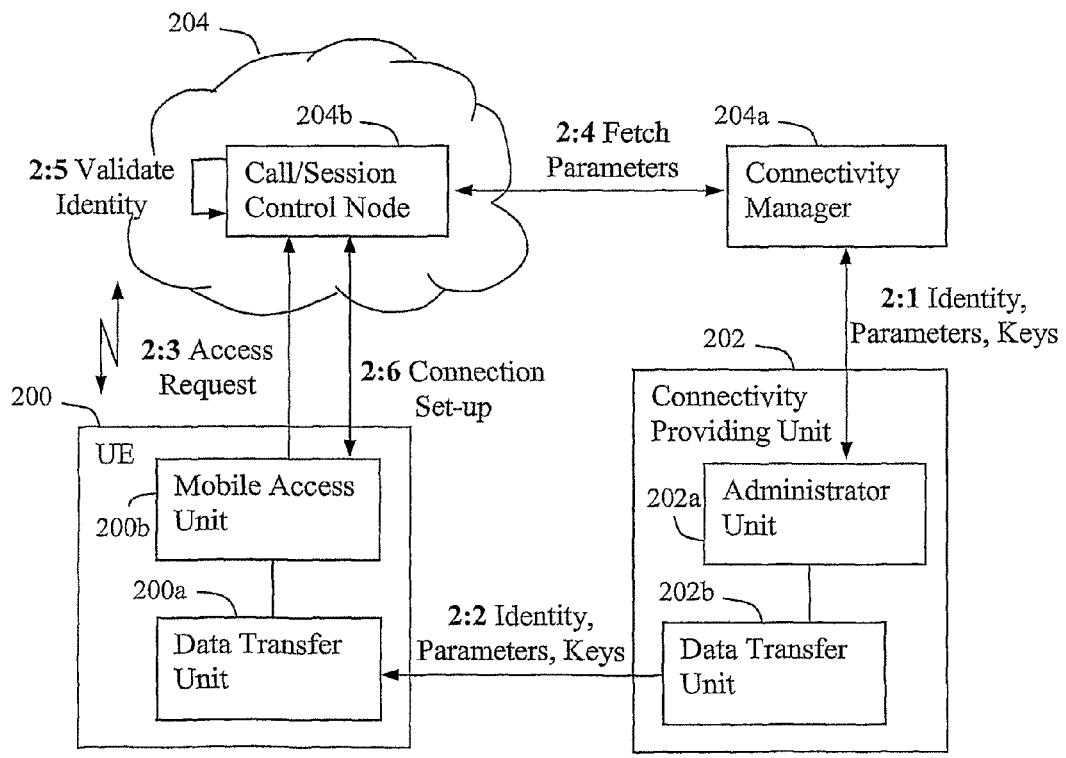
FIG. 2 is a schematic block diagram illustrating a procedure for providing connectivity with a communication services network for a mobile user equipment or terminal, according to one embodiment.

FIG. 2 illustrates schematically a procedure for obtaining connectivity with a public communication services network for a mobile terminal, according to one embodiment. The communication services network may be any type of public network providing any services to a mobile terminal involving a connection and the communication of signals and data, such as a mobile access network using, e.g., GSM, UMTS or GPRS standards, a WLAN or an IMS network for multimedia services.

FIG. 2 shows a mobile terminal denoted "UE" (User Equipment) 200, a connectivity providing unit 202 and a public communication services network 204. As mentioned above, the connectivity providing unit 202 may be situated in a vendor shop or the like selling connectivity to subscription-less mobile users, although the present invention is not limited thereto. Thus, it is assumed that a user of terminal 200 purchases connectivity from the vendor and pays for a limited call/session time, connectivity lifetime, or amount of communicated data/bandwidth, here generally referred to as the amount of connectivity. The user may pay in cash, by credit card or otherwise, although this is not technically relevant for the present solution.

In a first illustrated step 2:1, the connectivity providing unit 202 somehow acquires a temporary connectivity identity, e.g. TMSI (Temporal Mobile Station Identifier) or similar, and associated security parameters from a connectivity manager 204a controlled by the network 204. Depending on the implementation, the connectivity providing unit 202 may request for the connectivity identity and parameters from connectivity manager 204a, when the user makes the purchase, e.g. regarding a specific amount of purchased connectivity. Alternatively, the connectivity providing unit 202 may acquire a plurality of connectivity identities and associated security parameters in advance, e.g. once a day, week or the like, for later sale, where each connectivity identity has corresponding specific security parameters.

Moreover, each temporary connectivity identity is valid for a predetermined amount of connectivity which, as mentioned above, may be limited with respect to call/session time, lifetime and/or data/bandwidth amount. The connectivity identity and parameters are thus received in step 2:1 by an administrator unit 202a in unit 202, preferably over a protected communication link or otherwise. The connectivity identity and associated security parameters have previously been registered in the connectivity manager 204b as corresponding to the predetermined amount of connectivity.

In a next step 2:2, a specific temporary connectivity identity and associated security parameters, according to the purchased amount, are transferred or "pushed" to the mobile terminal 200, and optionally also one or more keys to be used for protection of communicated data as the terminal gains a connection. It is also possible to load a specific communication protocol into the mobile terminal in this step, to be used for communication with the network. In step 2:2, the information is transferred from a data transfer unit 202b to a corresponding data transfer unit 200a in the terminal over a local communication link that cannot be overheard by a third party, e.g. a Bluetooth or NFC link, or a cable. The transferred information further includes a network identifier or similar, to be used later when accessing the network. Hence, the received temporary connectivity identity is valid for the purchased amount of connectivity.

Next, the user attempts to communicate by means of the purchased connectivity by activating the terminal 200 which then, accordingly, sends an access request or similar, by means of a mobile access unit 200b, reaching a call/session control node 204b in the network 204, in a further step 2:3. The terminal can use the network identifier or similar received in step 2:2 to "find" the network. In effect, the access request in this step initiates a registration procedure for the terminal 200 with the network 204. Basically, the network will need to validate the temporary connectivity identity but not the terminal itself to allow access, whereas the user may want to validate the network. The access request (or connection request) thus includes at least the temporary connectivity identity obtained in step 2:2. Depending on the implementation, the security parameters, or at least parts thereof, may also be included initially as well in the access request, or may be sent at a later point during the registration procedure.

In response to the access request of step 2:3, the call/session control node 204b fetches security parameters from the connectivity manager 204a that correspond to the temporary connectivity identity received in the access request, in a following step 2:4. As mentioned above, these have been stored previously by connectivity manager 204a before supplied in step 2:1. Connectivity manager 204a also notifies node 204b on the amount of connectivity entailed by the temporary connectivity identity, if not already known at node 204b.

Node 204b then validates the received temporary connectivity identity in a further step 2:5 by obtaining the security parameters from the terminal 200, if not already received with the access request in step 2:3. Node 204b thus compares the security parameters fetched from connectivity manager 204a in step 2:4 with the ones received from the terminal 200. If they match, e.g. are equal or correspond otherwise in some predetermined manner (e.g. using a hash function or similar), access can be allowed for the terminal 200 and a connection set-up procedure can be completed in a final step 2:6. Hence, the security parameters effectively constitute a "shared secret" for mutual validation/authentication. As mentioned above, the network 204 is also automatically authenticated towards the terminal 200 when the one or more protection keys, if received in step 2:2, are applied successfully during the communication with network 204.

Figure 3:
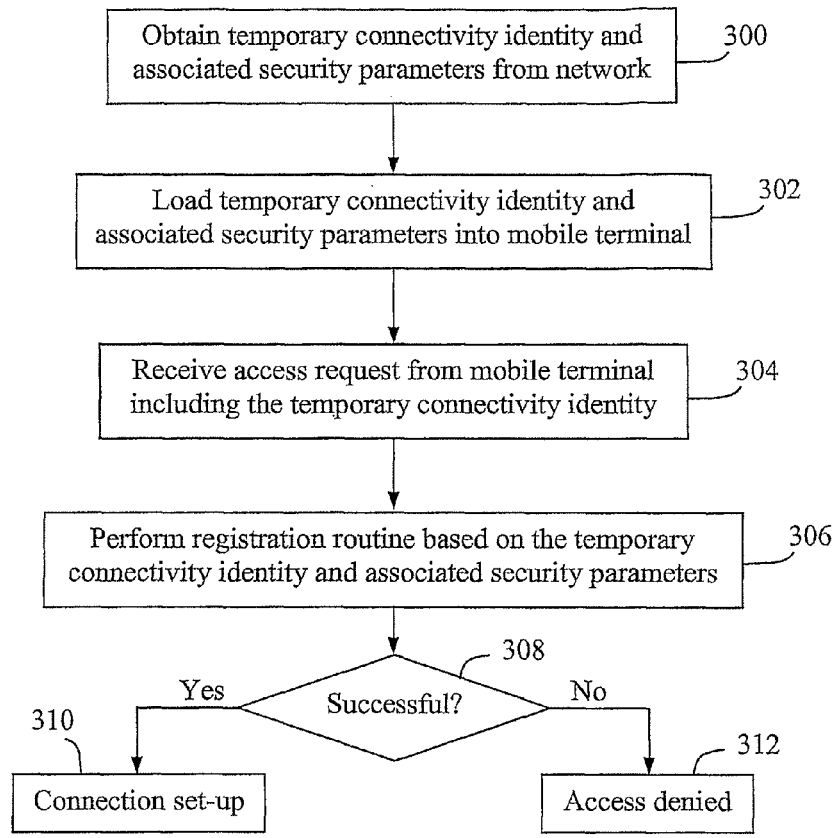
FIG. 3 is a flow chart illustrating the basic steps for providing connectivity with a communication services network for a mobile terminal or user equipment, according to another embodiment.

In FIG. 3, a flow chart is shown with steps for providing connectivity with a public communication services network for a mobile terminal or user equipment, according to another embodiment. In a first step 300, a temporary connectivity identity and associated security parameters are obtained from the network at a connectivity providing unit, which basically corresponds to step 2:1 in FIG. 2. It is assumed that the terminal user acquires connectivity rights in accordance with the temporary connectivity identity, by purchase or otherwise, which may be done before or after step 300, depending on the implementation.

In a next step 302, the temporary connectivity identity and associated security parameters are loaded into the mobile terminal using a local communication link, which basically corresponds to step 2:2 in FIG. 2. Optionally, a communication protocol may also be loaded into the mobile terminal in this step, to be used for communication with the network. Thereafter, the mobile terminal is free to use the obtained connectivity for communication over the network. Thus, in a following step 304 of the present process, an access request is received in the network from the mobile terminal including at least the acquired temporary connectivity identity, which basically corresponds to step 2:3 in FIG. 2.

Next, a network registration routine is generally performed in a step 306 for the mobile terminal, based on the temporary connectivity identity and associated security parameters. The registration routine involves at least the validation of the temporary connectivity identity, thereby allowing a connection with the network according to the corresponding connectivity amount. No further validation is needed for the terminal or the user in this solution, i.e. the terminal and/or user can basically be "untrusted" since the connectivity has already been paid for. Further, no operator secrets or proprietary algorithms are stored on the terminal.

It is then determined in a next step 308 if the registration of the mobile terminal was successful, by checking whether security parameters received from the terminal match those stored by the network, basically as described above for step 2:5 of FIG. 2. If a match can be certified, a connection can be set up for the mobile terminal, in a step 310. However, if the registration was not successful, i.e. the security parameters from the terminal do not match those stored by the network, access is denied for the terminal, in a last shown step 312.

Figure 4:
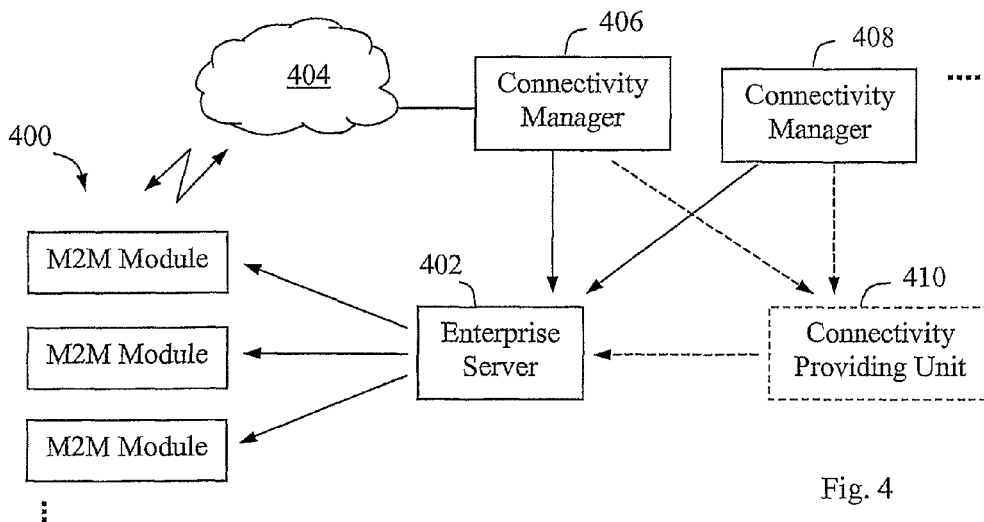
FIG. 4 is a schematic block diagram illustrating a procedure for providing connectivity with a communication services network for a plurality of M2M modules, according to yet another embodiment.

In the previously described examples, it was assumed that the terminal user visits a store or the like and obtains connectivity from the connectivity providing unit, after having purchased the connectivity either in the store or otherwise. In addition, the present solution can also be used in a somewhat different context where a plurality of M2M modules are installed at different locations for communicating data or information over a public access network for mobile communication. An embodiment for providing connectivity for a plurality of M2M modules over a public network without requiring any network subscriptions and/or a SIM application in each module, will now be described with reference to a schematic block diagram shown in FIG. 4.

A plurality of M2M modules 400 located at different sites are controlled and/or managed by a central server 402, here called "enterprise server". The modules 400 are all capable of communication over a public access network 404, provided that connectivity is obtained in the following manner. The enterprise server 402 obtains a set of temporary connectivity identities and associated security parameters from a connectivity manager 406 of the network 404 and optionally from similar connectivity managers 408 . . . of other networks as well. Alternatively, the connectivity identities and security parameters may be obtained from an intermediate connectivity, providing unit 410 acting as a connectivity selling agent or the like for the connectivity managers 406, 408 . . . , as indicated by dashed arrows in the figure.

The enterprise server 402 then distributes the obtained temporary connectivity identities and associated security parameters to the M2M modules 400, as shown by arrows thereto, using suitable local communication links as described above. In this example, the enterprise server 402 thus acts technically as a connectivity providing unit basically in the same manner as unit 202 described for FIG. 2 above. The above-mentioned keys for communication protection may also be distributed to the modules 400 in this way. The modules 400 can then communicate over network 404 and other networks, if applicable, by means of the received identities/parameters/keys.

An example will now be described of how a procedure can be implemented for providing connectivity with a UMTS access network for a mobile terminal, with reference to a signalling diagram shown in FIG. 5. It should be noted that the specific security parameters mentioned in this example are used here mainly to adapt to procedures for registration and security commonly used today, in order to minimise the impact on such routines. However, the present invention is generally not limited to any specific security parameters, security routines and/or protocols.

Figure 5:
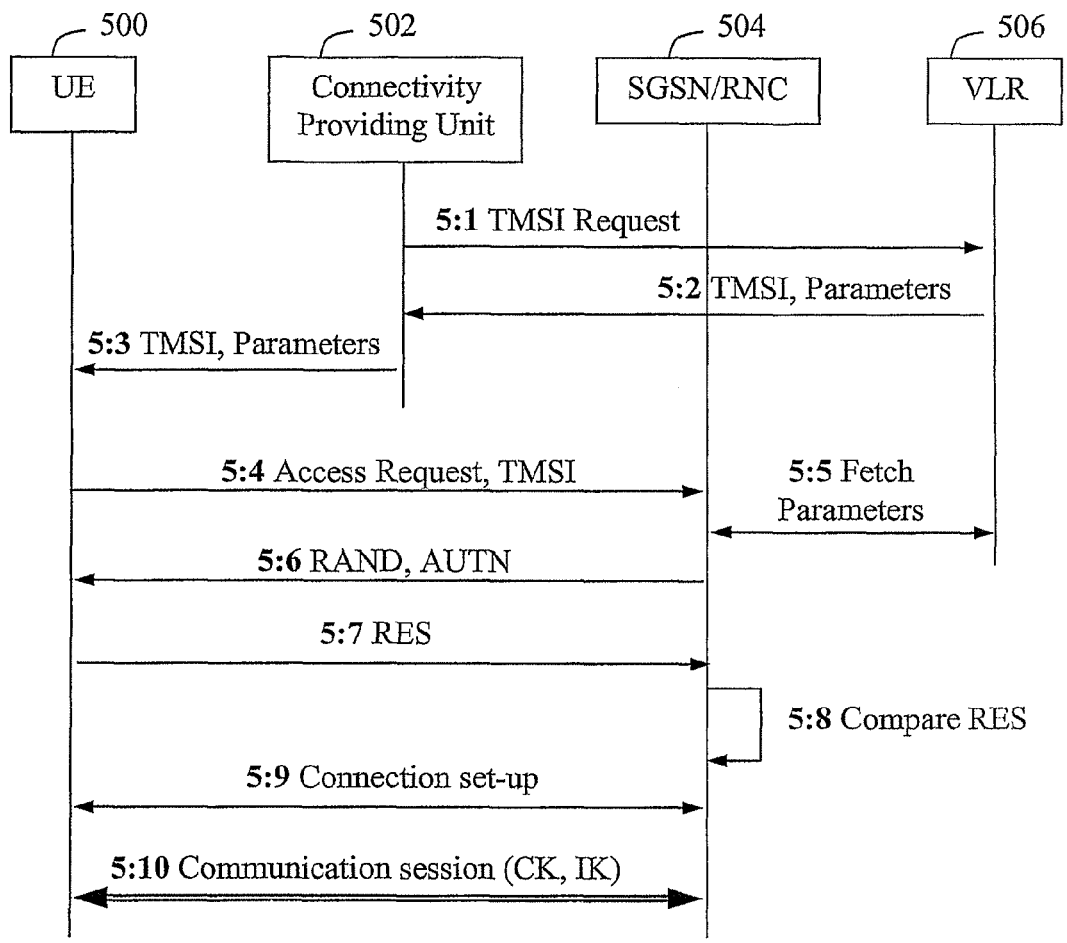
FIG. 5 is a signalling diagram illustrating a procedure for providing connectivity with a UMTS access network for a mobile user equipment, according to an exemplary implementation.

FIG. 5 illustrates a mobile terminal denoted UE 500, a connectivity providing unit 502, an SGSN (Serving GPRS Support Node) combined with an RNC (Radio Network Controller) 504, in this context acting together as a function for call/session control in the UMTS access network, and a VLR node 506 acting as a connectivity manager for the UMTS access network. These elements 500-506 thus basically correspond to elements 200, 202, 204b and 204b in the above-described FIG. 2, respectively. In accordance with UMTS standards, the functions of the call/session control node described above may basically be implemented in an SGSN node and an RNC (possibly involving a base station "Node B" as well). For example, the actual encryption described below is terminated in the RNC.

Again, it is assumed that the user of UE 500 has acquired the rights for a certain amount of connectivity by purchase or otherwise, as similar to the previous examples. The connectivity providing unit 502 is therefore triggered by an operator, e.g. in a connectivity selling store, to send a request to the VLR 506 in the access network, in a first step 5:1, for a temporary connectivity identity, in this case a TMSI, corresponding to the acquired connectivity rights. The desired amount of connectivity (e.g. in terms of time or bandwidth) is also indicated in this request in a suitable manner.

In a step 5:2, VLR 506 then responds by sending a TMSI and associated security parameters valid for the TMSI in the access network, to the connectivity providing unit 502. The TMSI has thus been registered in the VLR 506 together with the security parameters and must be generated in such a way that no collisions with other TMSIs occur. The TMSI (and associated security parameters) may be time-stamped with a period of validity for call/session time and/or connectivity lifetime, as described above. A limitation may also have been set for the amount of data/bandwidth allowed when the TMSI is used for communication. One or more communication protection keys, as described above, may also be sent in this step.

In a next step 5:3, the received TMSI and its associated security parameters and protection keys are pushed to UE 500 from connectivity providing unit 502 over a local communication link using, e.g., Bluetooth, NFC, IrDa (Infrared Data Association) or other short range communication technology such as a cable. A suitable network identifier is also sent in this step to facilitate the access for UE 500.

As described above, the security parameters are required to at least authenticate or validate the TMSI towards the access network. In a possible implementation, the security parameters associated with the TMSI and protection keys may be included in a "security context" containing the following parameters: RAND (random number), AUTN (authentication response), RES, CK, and IK, possibly in multiple copies, in a more or less conventional manner, thereby conforming to existing authentication procedures. The parameters CK and IK are to be used as protection keys in the forthcoming communication. Alternatively, only one copy of the security context may be sent to the UE 500, whereas further authentication vectors for any subsequent communication can be generated from the original ones by means of a given function f; f(RAND, AUTN, RES, CK, IK)=(RAND, AUTN, RES, CK, IK)$_{new}$. Yet another alternative is that only one of RAND and AUTN is transferred to UE 500.

In either case, it may be required that the terminal's RES must correspond to an RES stored in the network (referred to as XRES) in order to authenticate the TMSI successfully. From the network's viewpoint, this procedure will then basically correspond to the conventional security routine referred to as "AKA (Authentication and Key Agreement)". It may also be required that the protection keys CK and IK used by the network must correspond to the CK and IK used by the terminal to enable the communication. In that case, the parameters RAND and AUTN are only used as pointers to the parameters RES, CK and IK at the terminal side. Another possible alternative is that the security parameters include KSI, CK, and IK, in which case the authentication procedure will behave accordingly.

In the shown example of FIG. 5, at some point when the user wishes to communicate after acquiring connectivity according to the previous steps, UE 500 sends an access request along with the previously received TMSI to the SGSN/RNC function 504 to initiate a registration procedure with the network, in a following step 5:4. In response thereto, SGSN/RNC function 504 fetches security parameters for the received TMSI from the VLR 506, if packet switched is used, in a further step 5:5.

Then, SGSN/RNC function 504 responds to the access request of step 5:4 by sending suitable security parameters to UE 500, in accordance with a procedure used by the network for registration. In particular, the security parameters may be selected for authentication of the TMSI, although it is not necessary to authenticate the UE 500 nor its user as explained above. Therefore, in the shown example, SGSN/RNC function 504 sends at least the parameters RAND and AUTN to UE 500, in a step 5:6. UE 500 then checks the received RAND and AUTN to find the corresponding parameter RES and then responds by sending at least the found RES to SGSN node 504, in a following step 5:7.

SGSN/RNC function 504 then compares the received RES with its own stored RES in a step 5:8, and if the received RES is valid, i.e. if it matches the RES stored in SGSN/RNC function 504, a connection can be set up for UE 500 in a step 5:9. For example, after successful authentication in the SGSN node, CK and IK may be forwarded from the SGSN node to the RNC node for use in the communication with the terminal. Thereafter, the communication (i.e. call or session) can be executed in a final illustrated step 5:10 protected under the related CK and IK or one or more keys derived therefrom. It should be noted that in the present example the parameters RES, CK and IK are not generated by the RAND and AUTN, as in conventional registration procedures for subscription-dependent terminals, but simply fetched from the local terminal storage using the received RAND and/or AUTN as a pointer. This is to avoid any operator dependent derivation of the protection keys CK and IK.

The present invention thus provides a simple yet effective solution for gaining connectivity for a mobile terminal or UE with a communication services network, without requiring a subscription and trusted relation neither with the network nor a SIM application in the terminal. Therefore, it is only necessary to authenticate the temporary connectivity identity but not the terminal nor the user.

To add trust to the security parameters, the network operator can add signatures to the security parameters. Depending on the trust model used, these signatures can be verified in different ways. One option is that once the mobile terminal or UE is connected to the access network, it is possible for the terminal to verify the operator's signature at a trusted third party. Another option is that the terminal carries certificates from a set of trusted operators, and verifies that the security parameters are related to one of these. A third alternative is that the connectivity providing unit is trusted, and that it transmits a signed certificate from the operator to the terminal over the local communication link.

As long as the temporary connectivity identity (e.g. TMSI) is valid, the corresponding security parameters can be used. The airtime, available bandwidth as well as lifetime of the connectivity identity could be dependent on the payment. The method to achieve this is preferably to use similar models for payment as are used today with pre-paid or "pay-as-you-go" subscriptions. A network operator can also choose to time stamp the temporary connectivity identity and/or security parameters, and when the time expires, the identity/parameters cannot be used any more. In this way, the operational costs can be reduced.

Furthermore, it is preferably possible to renew the connectivity by additional payments for updating the lifetime/session time/bandwidth for the used temporary connectivity identity and/or security parameters before expiry. For example, a new updated temporary connectivity identity and/or security parameters can be pushed to the terminal from the connectivity providing unit, either over the local communication link or remotely over the access network, provided that the temporary connectivity identity can be identified so that its validity can be updated in this way. The latter option may be particularly useful in the case of multiple M2M modules for which the connectivity can be renewed easily. In the example shown in FIG. 4, the enterprise server 402 may thus send updated temporary connectivity identities and/or security parameters to the M2M modules 400 over a cellular access network to which the modules are connected, before expiry.

It is also possible to transfer a remaining amount of connectivity that has not yet been consumed by the terminal to another mobile terminal. This can be done by simply sending the temporary connectivity identity and associated security parameters from the used terminal to the new terminal, e.g. using a local communication link such as the one used for initially receiving the identity and parameters. On the other hand, the network operator may require that the sold connectivity is used by a particular terminal only. This can be accomplished by a public key arrangement binding the security parameters to the user/terminal, which is however outside the scope of the present invention.

While the invention has been described with reference to specific exemplary embodiments, the description is generally only intended to illustrate the inventive concept and should not be taken as limiting the scope of the invention. The present invention is defined by the appended claims.

The invention claimed is:

1. A method of providing connectivity with a public communication services network for a mobile terminal, comprising the following steps:
    obtaining, at a connectivity providing unit, a temporary connectivity identity and associated security parameters from the network, wherein the temporary connectivity identity and associated security parameters are unknown to the mobile terminal; and
    loading the temporary connectivity identity and associated security parameters into the mobile terminal from the connectivity providing unit over a local communication link, thereby enabling the mobile terminal to register with the network based on said temporary connectivity identity and associated security parameters, in order to set up a connection with the network for communication services,
    wherein loading the temporary connectivity identity and associated security parameters further enables the mobile terminal to transfer a remaining connectivity amount from said terminal to another mobile terminal.

2. A method according to claim 1, wherein the local communication link is any one of: a wireless Infrared link, a wireless Bluetooth link, a wireless near field communication (NFC) link, or a wired link.

3. A method according to claim 1, wherein the temporary connectivity identity is validated at the network during said registration by receiving at least a part of the associated security parameters from the terminal and comparing them with corresponding security parameters stored in the network.

4. A method according to claim 3, wherein the temporary connectivity identity is validated when the received parameters and the stored parameters are equal or correspond otherwise in a predetermined manner.

5. A method according to claim 1, wherein the temporary connectivity identity is valid for a predetermined amount of connectivity including at least one of: call/session time, connectivity lifetime, and amount of data/bandwidth.

6. A method according to claim 1, wherein the mobile terminal is an M2M module receiving the temporary connectivity identity and associated security parameters over the local communication link from an enterprise server, wherein the temporary connectivity identity and associated security parameters are unknown to the M2M module.

7. A method according to claim 1, wherein one or more protection keys are also loaded into the mobile terminal over the local communication link, to be used by the terminal to protect the communication when a connection has been established with the network, wherein the one or more protection keys are unknown to the mobile terminal.

8. A method of providing connectivity with a public communication services network for a mobile terminal, comprising the following steps:
    obtaining, at a connectivity providing unit, a temporary connectivity identity and associated security parameters from the network, wherein the temporary connectivity identity and associated security parameters are unknown to the mobile terminal; and
    loading the temporary connectivity identity and associated security parameters into the mobile terminal from the connectivity providing unit over a local communication link, thereby enabling the mobile terminal to register with the network based on said temporary connectivity identity and associated security parameters, in order to set up a connection with the network for communication services, wherein the connectivity can be renewed by loading an updated temporary connectivity identity and associated security parameters into the terminal over the network, wherein the updated temporary connectivity identity and associated security parameters are unknown to the mobile terminal.

9. A mobile terminal adapted to obtain connectivity with a public communication services network comprising:

a data transfer unit adapted to receive a temporary connectivity identity and associated security parameters from a connectivity providing unit over a local communication link, wherein the temporary connectivity identity and associated security parameters are unknown to the mobile terminal and the connectivity providing unit obtained the temporary connectivity identity and associated security parameters from the network, and a mobile access unit adapted to register with the network based on said temporary connectivity identity and associated security parameters, in order to set up a connection with the network for communication services, wherein the data transfer unit is further adapted to transfer a remaining connectivity amount to another mobile terminal.

10. A mobile terminal according to claim 9, wherein the local communication link is any one of: a wireless Infrared link, a wireless Bluetooth link, a wireless near field communication (NFC) link, or a wired link.

11. A mobile terminal according to claim 9 adapted to use said temporary, connectivity identity and associated, security parameters to obtain connectivity with at least one of: a mobile access network, a wireless local area network (WLAN) and an Internet Protocol Multimedia Subsystem (IMS) network.

12. A mobile terminal according to claim 9, being an M2M module adapted to receive the temporary connectivity identity and associated security parameters over the local communication link from an enterprise server acting as said connectivity providing unit, wherein the temporary connectivity identity and associated security parameters are unknown to the M2M module.

\* \* \* \* \*